May 17, 1960  A. JAUSS  2,936,485
APPARATUS FOR MAKING RING CLOSURES
Filed Dec. 24, 1956  2 Sheets-Sheet 1
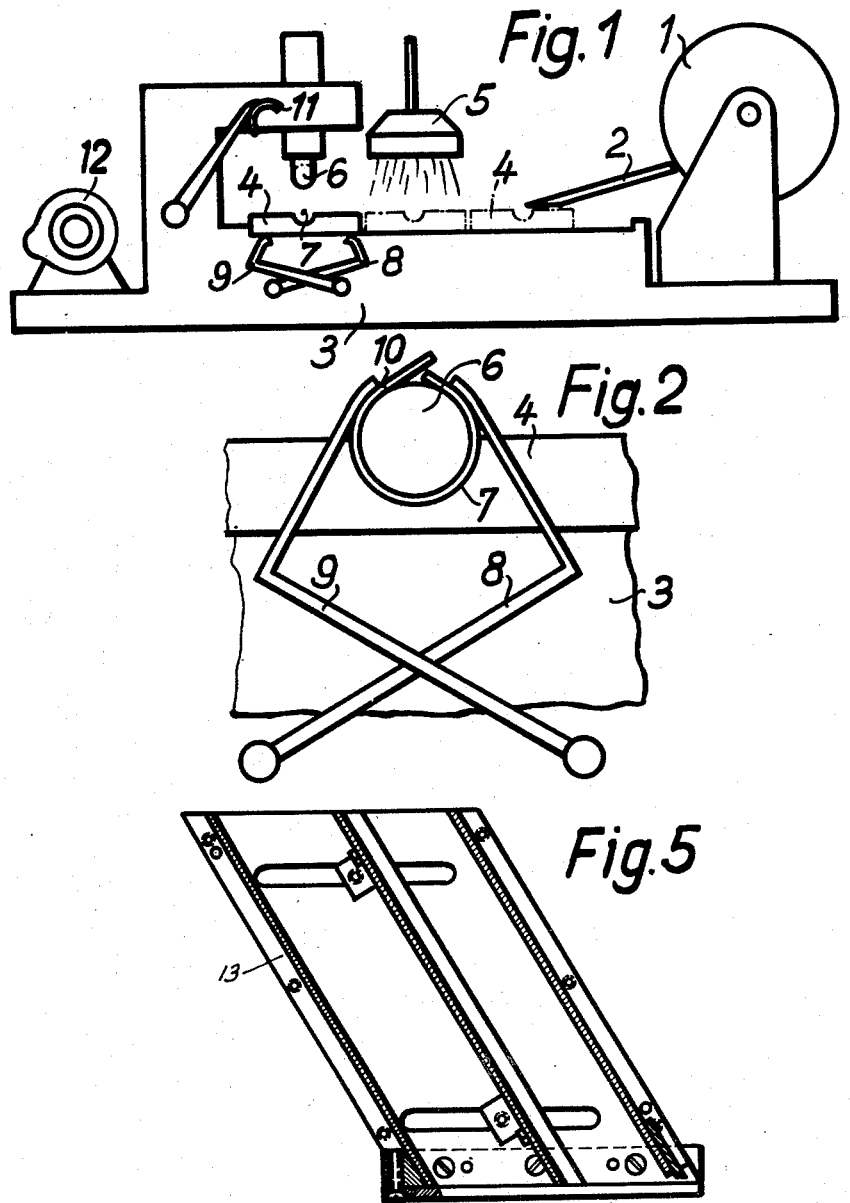
INVENTOR
ALBERT JAUSS
By Kullistein,
Aty

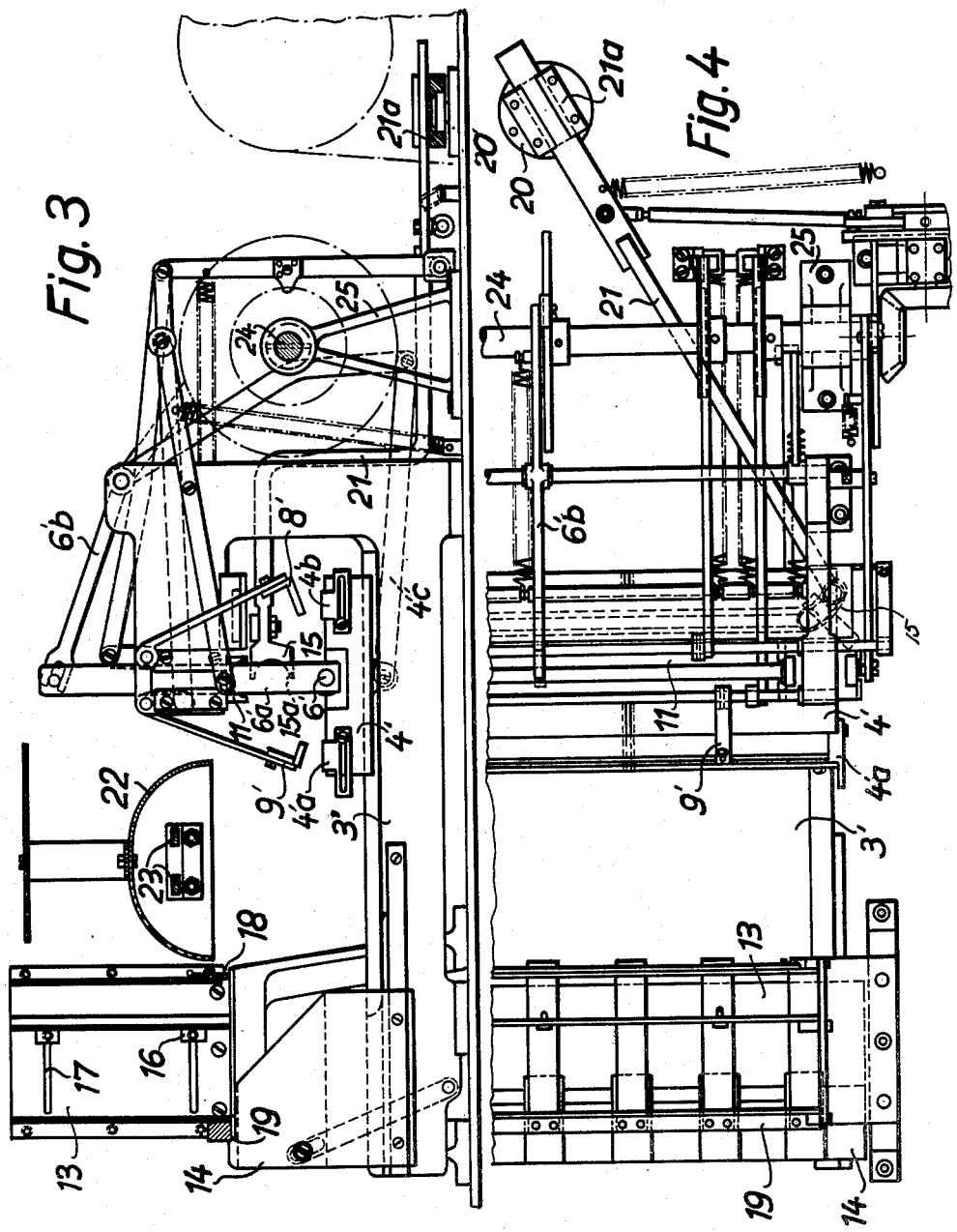

United States Patent Office 2,936,485
Patented May 17, 1960

2,936,485

APPARATUS FOR MAKING RING CLOSURES

Albert Jauss, Stuttgart-Bad Cannstatt, Germany, assignor to Bohm & Co., Stuttgart-Bad Cannstatt, Germany Application December 24, 1956, Serial No. 630,314

Claims priority, application Germany January 2, 1956

7 Claims. (Cl. 18—19)

This invention relates to files and binders, and more particularly, to apparatus for making the comb rolls or spaced ring type cylindrical assemblies in common use for filing and binding purposes.

It is a primary object of the invention to provide apparatus for manufacturing from thermo-plastic materials, comb rolls of any desired shape, for example, of circular or oval shape, or flattened on one side, or with overlapping or beaded edges, or with a double bottom, in a continuous operation and in a simple manner.

Other objects, and the manner in which the same are attained, will become apparent as this specification proceeds.

Up to now, these comb rolls were made by rolling in metallic moulds or dies, an operation which placed serious limitations on the shape or contours of the rolls made in this fashion.

According to the present invention, the comb rolls are no longer made by rolling, but by bending, and for this purpose, the flat combs are conveyed to a die wherein at first, by means of a movable mandrel, the central portion of the roll is bent or curved, whereupon arms applying from both sides bend, to the point of overlapping, the yet uncurved lateral portions to both sides of the curved central portion, the roll being finally closed by a second movable die element. Prior to engagement by the dies, the combs are heated so as to be rendered plastic and susceptible to deformation.

The apparatus used in carrying into effect the method outlined above, comprises principally a die displaceable along a plane path, said die having a cavity corresponding to one half the circumference of the roll; a mandrel movable at right angles relative to the axis of the roll; two lateral slide arms displaceable in parallel to the axis of the roll, and a further die element for the other half of the roll which also is movable at right angles with respect to the axis of the roll, all members being controlled by a central control element such as, preferably, a mechanically driven eccentric or cam disk, according to a predetermined rythm. The several tools can be arranged on the standard for ready replacement to permit comb rolls of any desired configuration to be made for the same apparatus by a simple change of tool elements.

The punched flat comb-shaped blanks may be stored in a rotary drum from which they are conveyed, by a simple conveyor means, to the lower half of the die, to be further conveyed, together therewith, past the heating element, to the tools. If it is desired to speed up the operation, the comb-shaped blanks may be preheated in the storage drum to a temperature of e.g. about 30–40° C. where the material retains sufficient rigidity to keep its shape.

In a modification of the apparatus briefly outlined above, the rotary storage drum is omitted and replaced by a stationary magazine wherein the punched comb-shaped blanks are stacked and from which they are ejected to be conveyed to the die. The ejecting mechanism can be adjusted to precisely correspond to the operations of the die.

This modification involves the further feature that the slide arms provided, for purposes of initiating the overlapping, on both sides of the vertically reciprocating mandrel, are arranged for adjustment, above the mandrel. This arrangement simplifies the apparatus very materially. When the slide arms are driven from below the mandrel, the die must be provided with corresponding notches through which the slide arms can pass to engage the work. This arrangement places limitations on the form of the slide arms and their adjustability, as the notches cannot be provided of any desired size.

Moreover, when the arms are arranged above the mandrel, adequate space is available to give them any desired design. Another advantage of this arrangement is that the motion of the slide arms no longer depends on the operation of the die, and this can operate independently.

The invention further contemplates a stripping mechanism which, following the deformation, axially strips the comb roll from the mandrel to which it tends to adhere because of its plasticity. This stripping mechanism is so designed that any danger of damage to the comb rolls is excluded. The stripping mechanism has a drive such that operation of the stripping member in precise axial alignment along the mandrel is assured.

The various components of the apparatus are so arranged according to the invention that they can be precisely adjusted to any and all conceivable measurements of the combs. The magazine, for example, is designed to accommodate combs of the largest dimensions which might be required; this magazine is equipped with adjustable stops which permit stacking narrower and shorter blanks.

In a similar manner, the die, the slide arms, the mandrel and the stripping mechanism are arranged for ready adaptation to the size of the blank, and the shape of the finished article during any given operation.

In the drawing accompanying this specification and forming part thereof, two embodiments of apparatus, designed to carry the present method into effect, are shown diagrammatically by way of example.

In the drawing,

Fig. 1 is a schematic side view of the apparatus being one embodiment of the invention, in a state of rest;

Fig. 2 is a side view of a detail of Fig. 1, during operation;

Fig. 3 is a side view of a second embodiment of the invention, shown partly in section;

Fig. 4 is a top view of the apparatus of Fig. 3; and

Fig. 5 is a schematic, perspective view of a magazine designed to accommodate combs having one long side provided with a rib.

Referring now to the drawings, and first to Figs. 1 and 2, a rotary drum-shaped storage container 1 releases continuously the previously punched, flat comb-shaped blanks to the conveyor 2 from which they pass on one of the die halves 4 which are arranged for back and forth movement along the table 3. While on the die 4 and jointly with the same, the blanks are conveyed past the heating source 5 which, for example, may be of the electrical resistance, coil or plate type or may be a source of infra-red radiation. The die then proceeds into the operative position shown in full lines in which it is arrested, for example, by stops or abutments on the table 3. While in this position, the blank is forced by the descending, round mandrel 6 into the cavity 7 of the die 4 so that the center portion of the blank is bent into the desired roll shape, while on both sides of the center portion, the flat marginal portions extend upwardly. At this point, the first step of the shaping procedure is terminated.

At this point, the slide arms 8 and 9, which may be pivotally supported on the standard, move upwardly one after the other, first from one side and then from the other, through notches in the table and in the die 4, to force the flat marginal portions of the comb-shaped blank inwardly, to a point where the desired overlapping is initiated and if desired, the comb edges are also provided with beads, notches, etc. This step is schematically illustrated in Fig. 2 wherein the comb roll is shown at 10. The two slide arms retract before reaching the mandrel 6, whereupon the second half 11 of the die moves downwardly to impart to the roll its ultimate, closed shape. The half die 11 and the mandrel surrounded by the roll, move in their respective starting positions whereafter the roll is removed laterally from the mandrel, in a simple manner.

All movements are controlled by the cam disk 12. Any conventional means may be used in translating the control movement of the cam disk to the individual tool elements; in order to simplify the illustration, these means have not been shown in the drawing.

The tool elements are readily exchangeable to permit comb rolls of any desired diameter and shape to be produced on the machine and by the method of the invention.

The temperature of the blanks is controlled, in a well known manner, by thermostats and resistances.

The embodiment of the invention according to Figs. 3 to 5 distinguishes over the apparatus of Figs. 1 and 2, in several important respects. This machine comprises a stationary magazine 13 wherein the punched, flat blanks are stacked on top of one another. An adjustable device 17 serves the purpose of guiding the blanks in vertical direction. This device is preferably arranged to engage the comb notches to maintain the combs in precise alignment on top of one another. An adjustable stop 16 which may be present on both sides of the magazine 13, is provided for the purpose of adjusting the magazine 13 to the width of the comb bridge portion encountered in any given operation.

The two devices 16 and 17 thus prevent the stacked combs from being displaced relative to one another. Moreover, this arrangement ensures that the lowermost comb is always disposed precisely in the plane of ejection so that no tilting in the course of ejection can occur.

For the purpose of ejecting the comb which is lowermost in the magazine 13 at any given point of the operation, a discharge slot 18 is provided in the magazine which can be adjusted to the prevailing thickness of the blanks processed. Underneath the stationary magazine 13, an ejector 14 is arranged for back and forth displacement which glides on guide rails provided on the table $3^1$, and is operated by a driving lever system disposed on the side of the ejector. This drive may be controlled by a cam, for adjustment in accordance with the cycle of operation and the length of stroke required.

The top of the ejector 14 is provided with an ejector edge 19 which is disposed in a plane slightly lower than the plane in which the top surface of the narrowest blank to be used in the machine, would be located. Accordingly, when the ejector 14 moves toward the die 4, the edge 19 engages, through corresponding recesses in the magazine 13, the back of the lowermost blank in the stack, and removes the same from the magazine. On leaving the magazine, the blank follows an inclined downward path leading into the die $4^1$, which has been displaced on the table $3^1$ toward the magazine to be ready to receive the blank. The stops $4^1a$ and $4^1b$ on the die $4^1$ can be adjusted to the precise width of the blanks used, and serve as limit stops as well as registering devices. The die $4^1$, which is similarly adjustable, is driven by means of a lever system $4^1c$.

According to the preferred embodiment of the invention illustrated in Figs. 3 to 5, the two slide arms or claws $8^1$ and $9^1$ which are disposed on opposite sides of the mandrel $6^1$—which is supported in a plunger $6^1a$—are mounted above the mandrel $6^1$ so that they can move into engagement with the premolded blank, through the empty space above the die $4^1$. The drive of the claws $8^1$ and $9^1$ is also effected from the top, through the lever system $6^1c$, the motion of which in turn is controlled by a cam disk which can be replaced or adjusted according to prevailing requirements.

The motion and stroke of the slide arm or claw members $8^1$ and $9^1$ can be adjusted so any conceivable shapes may be imparted to the blanks. Circular rolls can be made wherein the rings are open, or are closed with the ends joined flush with respect to one another, or else the ends overlap, or the points of the bent comb teeth can be rounded, or provided with flanges extending inside or outside the rings. It is further possible to flange or bead over the back of the comb roll, or impart a polygonal configuration to the bent comb structure.

The invention contemplates a stripping device 15 (shown in Figs. 3 and 4) which in its position of rest, is disposed outside the region wherein the mandrel $6^1$, the upper half 11 of the die, and the claws $8^1$ and $9^1$ operate. A cam control is provided which displaces the stripping member 15, at the appropriate time, into its operative position in proximity of the mandrel $6^1$. This stripping member 15 is bifurcated so that it can grip the comb roll, while it is disposed on the mandrel, at points located about midway on the circumference of the roll. The stripping member is provided, according to the invention, with a lining $15a$ of a soft material such as rubber, for example, to prevent the comb roll from being damaged in the course of its removal from the mandrel.

The stripping device 15 is shown, in detail, in Fig. 4. In line with its purpose, this device must execute a motion in precise axial alignment with the axis of the comb roll. To this end, the drive lever system 21 of the stripper 15 is guided for longitudinal displacement, in a turntable 20, the axis of which is disposed at right angles to the rocking plane of the stripper 15 and lever 21. This support according to the invention insures the necessary back and forth displacement of the lever 21 in its bearing $21a$, and the simultaneously necessary rotary displacement of the lever 21 and the bearing $21a$, on the turntable 20. The drive of the stripper 15, of course, is also adjustable corresponding to the length of the comb roll, and the working cycle.

The stripper 15 with its lining $15a$ of soft material is arranged, for ready replacement, on the lever 21. Between the shaping tools $6^1$, $8^1$, $9^1$ and 11 and the magazine 13, a heat source 22 is arranged. In contrast to existing installations, this heat source comprises a source of radiation 23 arranged above the comb roll so the heat rays, and preferably the infra-red radiation is conveyed directly to the comb roll to be deformed.

The drive of individual components of the apparatus may originate with the shaft 24 which is supported on bearing blocks 25 and which, in turn, mounts, for ready replacement, the cam disks controlling the several drive lever systems.

Fig. 5 shows a magazine which is particularly designed for combs wherein the bridge portion is provided with a marginal rib or flange projecting from the plane of the comb. Because of their uneven surface, combs of this kind cannot be stacked on one another. This problem is met by the invention by providing a magazine where the walls disposed parallel to the long sides of the combs, are arranged at an angle of about 60°. This magazine accommodates combs provided with a projecting marginal rib so they are stacked on top of one another in horizontal position, with the result that they can be removed by the ejector and conveyed into the die $4^1$, the same as combs with even, uniform surfaces. The only condition is that the side of the comb bearing the rib must face the direction of ejection.

The method and apparatus of the machines permit deforming, in an economic manner comb rolls of any and all commercial sizes. The machines are distinguished by the simplicity of their design, and an extreme facility of operation. An adjustment or exchange of the inset in the dies 4 or 4¹, the mandrel 6 or 6¹, and the claws 8 or 8¹ and 9 or 9¹, permits any desired variation of the shape of the comb roll produced, a variation which up to now called for several distinct machines. Moreover, the operation is very economical as all motions and operational steps are synchronized, and idling, or lost time due to preparations, are cut down to a minimum.

I wish it to be understood that I do not desire to be limited to the details of construction, design, or operation shown and described as numerous modifications within the scope of the following claims, involving no departure from the spirit of the invention nor any sacrifice of the advantages thereof, will occur to persons skilled in the art.

I claim:

1. Apparatus for making multiple overlapping ring type closures for paper binding and similar purposes, from comb-shaped blanks of thermoplastic material, comprising in combination, a split die including top and bottom halves, a mandrel arranged for vertical displacement to axially engage a blank disposed in said bottom half of the die, claw members for gripping and deforming the lateral portions of a blank engaged by said mandrel into overlapping relationship, arranged for moving in on said blank portions from opposite sides, and means for bringing the portions of the blank deformed by said claws, into engagement with the upper half of said die, said upper half of the die being arranged to move at right angles to the axis of the tubular blank to engage said deformed blank portions.

2. The apparatus according to claim 1, comprising a storage magazine, the bottom half of the die being arranged for displacement to convey a blank from the proximity of said magazine to the location of the dies, mandrel and claws while in their operating position, and a source of radiant heat arranged above the path of the blank from the magazine to said operating position.

3. The apparatus according to claim 1, wherein the top half of the die is arranged for displacement toward the bottom half of said die.

4. The apparatus according to claim 1, comprising a stationary storage magazine, a displaceable bottom die portion, and an equally displaceable ejector for conveying the lowermost blank in said magazine to said bottom die portion.

5. The apparatus according to claim 1, wherein the claws are pivotally supported above the mandrel.

6. The apparatus according to claim 1, comprising a storage magazine, a delivery slot at the bottom of said magazine, an ejector arranged for displacement relative to said magazine, an ejector edge at the top of said ejector, and recesses in said magazine for affording passage to said ejector edge so it can engage and withdraw the lowermost blank in said magazine.

7. The apparatus according to claim 1, comprising a storage magazine in the form of an obliquely cut prism, the cut extending at an angle of about 60°, whereby to stack blanks provided with a marginal rib projecting from the surface of the blanks.

References Cited in the file of this patent

UNITED STATES PATENTS

| | | |
|---|---|---|
| 647,993 | Schmidt | Apr. 24, 1900 |
| 1,330,172 | Crozier | Feb. 10, 1920 |
| 1,623,208 | Randall et al. | Apr. 5, 1927 |
| 1,652,697 | Boettger | Dec. 13, 1927 |
| 1,807,863 | Novick | June 2, 1931 |
| 1,906,392 | McLeod | May 2, 1933 |
| 1,915,075 | Taylor | June 20, 1933 |
| 2,211,744 | Nelson et al. | Aug. 13, 1940 |
| 2,302,379 | Reese et al. | Nov. 17, 1942 |
| 2,317,574 | Williams | Apr. 27, 1943 |
| 2,415,370 | Pityo | Feb. 4, 1947 |
| 2,491,528 | Spinner | Dec. 20, 1949 |
| 2,753,770 | Chapman | July 10, 1956 |

FOREIGN PATENTS

| | | |
|---|---|---|
| 687,873 | Great Britain | Feb. 25, 1953 |